United States Patent [19]
Ota

[11] 3,792,308
[45] Feb. 12, 1974

[54] ELECTROPHORETIC DISPLAY DEVICE OF THE LUMINESCENT TYPE

[75] Inventor: Isao Ota, Osaka, Japan

[73] Assignee: Matsushita Electric Industries Co., Ltd., Kadoma, Osaka, Japan

[22] Filed: June 8, 1970

[21] Appl. No.: 44,023

[52] U.S. Cl............ 315/150, 178/7.87, 313/54, 313/108 A, 313/108 R, 313/109.5
[51] Int. Cl................. H05b 33/00, H05b 43/00
[58] Field of Search... 313/108 A, 108 R, 109.5, 54, 313/92; 178/7.87; 315/169 TV, 150; 204/299 PE

[56] References Cited
UNITED STATES PATENTS

| | | | |
|---|---|---|---|
| 3,484,752 | 12/1969 | Kallmann | 313/108 R X |
| 3,176,132 | 3/1965 | Muller | 313/54 X |
| 3,145,156 | 8/1964 | Oster | 204/299 X |
| 3,383,993 | 5/1968 | Yeh | 204/299 X |
| 3,612,758 | 10/1971 | Evans et al. | 315/169 TV |
| 3,550,095 | 12/1970 | Kohashi | 313/92 X |

*Primary Examiner*—Palmer C. Demeo

[57] ABSTRACT

An electrophoretic display and/or recording device of the luminescent type in which a luminescent electrophoretic suspension layer including a dispersion of at least one electrophoretic material in a finely divided powder form suspended in a suspending medium is interposed between a pair of electrodes. Said suspension layer includes at least one luminescent component therein and emits luminescent light when radiation flux or electric field is applied thereto. An electric field is imposed across the electrophoretic suspension layer to change the luminescent property of the suspension layer by changing the spatial distribution of the electrophoretic material in the suspending medium elctrophoretically.

39 Claims, 25 Drawing Figures

INVENTOR
ISAO OTA

INVENTOR
ISAO OTA

INVENTOR
ISAO OTA 3,792,308

ELECTROPHORETIC DISPLAY DEVICE OF THE LUMINESCENT TYPE

BACKGROUND OF THE INVENTION

This invention relates to an electrophoretic display and/or recording device of the luminescent type and particularly to a luminescent electrophoretic display and/or recording device comprising at least one electrophoretic material suspended in a suspending medium.

A cathode ray tube is now widely used as an electric display apparatus because of its high speed, ease with which it can be scanned, and so on, but it still has some disadvantages. For example, a cathode ray tube is difficult to produce so that it has a flat panel or so that it has a large size. In addition, it requires a high voltage to operate.

There have been proposed many electric panel display devices such as an electroluminescent panel, arrays of luminescent diodes, incandescent lamps or plasma cells. They are all self-luminescent types, but are not in widespread use because of inferiority in, for example, luminescent efficiency, life or cost. Further, it is difficult for these devices to memorize or record the displayed image or to make a great color change by applied voltage. Liquid crystals are a possible medium of which to constitute a flat panel display apparatus capable of changing color by a change in an electric field or change in heat. At present they are not actually used because their properties are not entirely satisfactory for display purposes.

SUMMARY OF THE INVENTION

An object of this invention is to provide an electrophoretic device of the luminescent type for display and/or recording, which comprises a luminescent electrophoretic suspension layer.

A further object of this invention is to provide a large and/or flat luminescent display panel comprising a luminescent electrophoretic suspension layer.

A still further object of this invention is to provide a flexible panel for display and/or recording, which comprises a luminescent electrophoretic suspension layer.

These objects are achieved by a device for display and/or recording according to the present invention by the provision of a luminescent suspension layer including a dispersion of at least one electrophoretic material in a finely divided powder form suspended in a suspending medium, said suspension layer having two opposite major surfaces; a first electrode and a second electrode which are opposed to each other and are coupled to said two opposite major surfaces of said suspension across said suspension layer through said electrodes, said electric field changing the spatial distribution of said electrophoretic material of said dispersion to change the luminescent property of said suspension layer under application of radiation flux or an electric field.

Other objects and advantages of this invention will be apparent from the following description, the accompanying drawings and the appended claims.

BRIEF DESCRIPTION OF THE DRAWINGS

FIG. 6b is a cross-sectional view of the panel of FIG. 6a;

The size and shape of elements of the drawings should not be considered as actual sizes or even proportional to actual sizes because many elements have been purposely distorted in size or shape in order to more fully and clearly describe the invention.

Figures 1A, 1B:
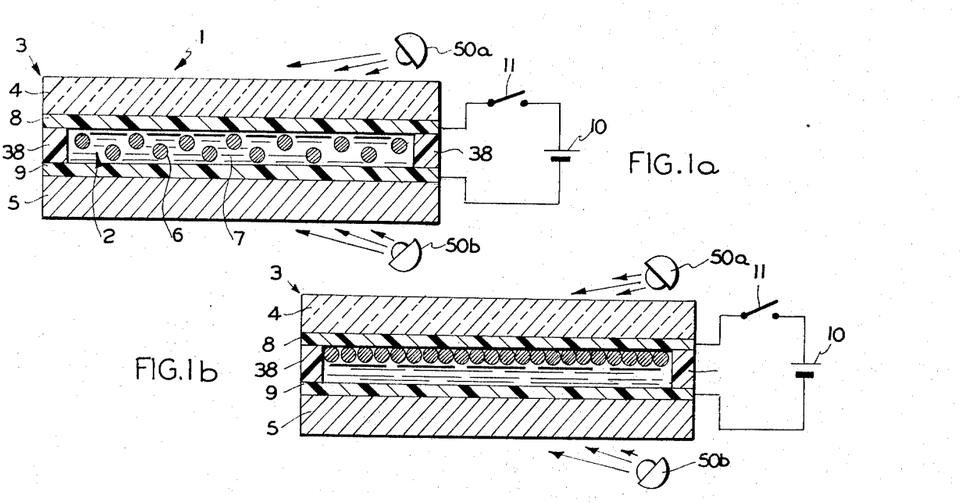
FIGS. 1a–1c are cross-sectional views of a first embodiment of a display and/or recording panel in accordance with the present invention.

Referring to FIG. 1a, reference character 1 designates, as a whole, an electrophoretic display and/or recording panel of the luminescent type which has a luminescent electrophoretic suspension layer 2 therein.

When said suspension layer 2 is in a fluid state, it is enclosed in a housing 3 having a frame 38 and two opposed major housing walls 4 and 5 which are transparent with respect to radiation flux and visible light.

Said suspension layer 2 has two opposite major surfaces along said two opposite major housing walls 4 and 5 and includes a dispersion of at least one electrophoretic material 6 in a finely divided powder form suspended in a suspending medium 7. The particles of the material 6 are shown greatly enlarged in this and subsequent figures for clarity of illustration. Said two opposite major surfaces of said suspension layer 2 are in contact, respectively, with a first electrode 8 and a second electrode 9 which are transparent with respect to radiation flux and visible light and are attached to the inner surfaces of said two opposite major housing walls 4 and 5.

Said first electrode 8 and second electrode 9 are connected to output terminals of a voltage source 10 through a switching-device 11. Before a D.C. electric field is supplied to said suspension layer 2 from said voltage source 10, the electrophoretic material 6 in a finely divided powder form is distributed uniformly throughout the suspending medium 7 as shown in FIG. 1a.

Radiation sources 50a and 50b, for example, U.V. light sources are positioned at the both sides of the panel 1 so as to apply radiation flux to said suspension layer 2 for brightening it at the both sides. When the electrophoretic material 6 is luminescent and emits, for example, green light under the excitation of the U.V. light and the suspending medium 7 is not luminescent and strongly absorbs the visible light and/or the radiation flux, the suspension layer 2 shows deep green colors at the electrodes 8 and 9 under the excitation by radiation sources 50a and 50b, respectively.

When the deep green suspension layer 2 is subjected to a D.C. electric field by said voltage source 10, the electrophoretic material 6 is caused to move electrophoretically in a direction either to a cathode or to an anode depending upon its polarity. For example, if the material 6 has a negative polarity, it moves and is deposited on the anode 8 and has a spatial distribution different from the uniform distribution, as shown in FIB. 1b.

Figure 1C:
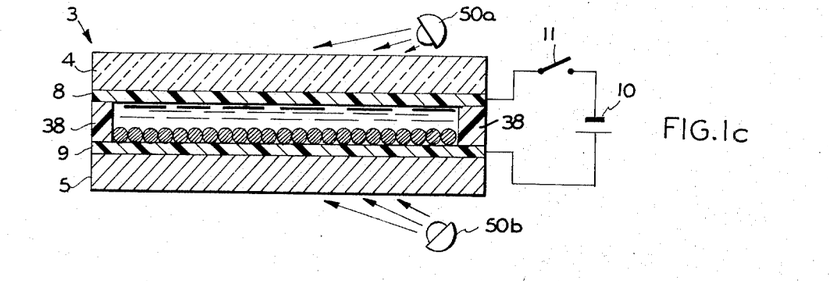

The resultant suspension layer 2 has a different spatial distribution of material 6 and a different luminescent property from the original suspension layer 2 having the uniform distribution of the material 6. The display and/or recording panel 1 shows bright green color on the anode side because the green light emitted, by radiation source 50a, from the layer of the electrophoretic material 6 deposited on the anode 8 is directly emitted through the anode 8 without being absorbed by the suspending medium 7. The panel 1 is dark on the cathode side because the green light emitted from the layer of the electrophoretic material 6 deposited on the anode is absorbed by the suspending medium 7 and does not come out from the cathode 9. By reversing the polarities of the applied voltage, the electrophoretic material 6 is deposited on the electrode 9 as shown in FIG. 1c and the color characteristic of the panel 1 can be reversed.

Though it is supposed that the suspending medium 7 is not luminescent in the foregoing description, it is possible that the suspending medium 7 is also luminescent. In this case, the device 1 in FIG. 1a shows, at both sides, a color which is an additive mixture of the luminescent colors of the suspending medium 7 and the electrophoretic material 6. The device in FIG. 1b or FIG. 1c substantially shows, at the electrode 8, luminescent colors of the electrophoretic material 6 or the suspending medium 7, respectively. The color characteristic of the device essentially depends upon the spatial distribution of the electrophoretic material, luminescent properties of the electrophoretic material and the suspending medium and transmission properties of the electrophoretic material and the suspending medium for radiation flux and visible light.

In such a way, the luminescent property of the device exposed to the radiation flux can change with electrophoretic movement of the electrophoretic material 6.

When only a small amount of the electrophoretic material 6 is deposited on the anode, the panel shows on the anode side, a halftone appearance dependent upon the amount of the electrophoretic material 6 deposited on the anode. Therefore, the color characteristic at the anode side can be controlled continuously by controlling the amount of the electrophoretic material deposited on the electrode. The amount of the electrophoretic material deposited on the electrode can be controlled by the strength or the length of time of application of a D.C. voltage. The color characteristic at the cathode side is also changed by the electrophoretic movement of the electrophoretic material 6 to the anode. In such a way, the display and/or recording panel 1 of the present invention can have its color characteristic changed by varying the strength, the length of time or the polarity of an applied electric field.

Electrophoretic material deposited on an electrode surface by electrophoresis will stay on the electrode even after removal of an applied electric field. This means that a display device according to the present invention employing electrophoresis of the elctrophoretic material suspended in a suspending medium can memorize output information without using further electric power. The panel can have the original color characteristic restored by applying an appropriate D.C. electric field having a reverse polarity to that of the initial D.C. electric field or by applying strong mechanical vibrations to the device. Application of an A.C. electric field to the suspension layer can effectively restore the original color characteristic of the panel.

In the device as shown in FIG. 1, one can observe the change in the luminescent property of the suspension layer 2 at both sides of the panel because the radiation sources are positioned at both sides of the panel 1 so as to brighten the suspension layer 2 at both sides and two housing walls and two electrodes are all transparent with respect to radiation flux and visible light. But when one observes the change in the luminescent property of the suspension layer 2 only at one side, for example, at the electrode 8 of the device 1 in FIG. 1, the housing wall 5 with the electrode 9 attached thereon can be replaced with an opaque conductive plate such as, for example, a metal plate and the radiation source 50b can be removed. The suspension layer comprising a luminescent suspending medium and at least one luminescent or non-luminescent electrophoretic material suspended in said luminescent suspending medium can also be used as a luminescent electrophoretic suspension layer 2 of the present invention. At least one of the components of the suspension layer 2, that is, the suspending medium 7 or the electrophoretic material 6 must be luminescent in the suspension layer 2 of the present invention and the residual component except the one luminescent component must be substantially opaque with respect to radiation flux and/or visible light emitted from the one luminescent component. The residual component can be opaque due to absorption and/or reflection, of the radiation flux or visible light.

It is also possible to construct a device of the type which has a radiation source behind the panel and emits visible light in front of the panel. When the device of this type is observed through the electrode 8 as well, the radiation source 50a is removed and the housing wall 4 and the electrode 8 must be transparent with respect to visible light and the housing wall 5 and the electrode 9 must be transparent with respect to radiation flux. In the following description, the operation of the device of this type is explained referring to FIGS. 1a–1c. When the electrophoretic material 6 is luminescent and the suspending medium 7 is non-luminescent and strongly absorbs the light emitted from the electrophoretic material 6 but scarcely absorbs the radiation flux, the brightness of the device with the same spatial distribution of the electrophoretic material 6 as shown in FIG. 1a, FIG. 1b or FIG. 1c is medium, high or low, respectively. On the other hand, when the non-luminescent suspending medium 7 does not seriously absorb the light emitted from the material 6 but strongly absorbs the radiation flux, the brightness of the device in FIG. 1a, FIG. 1b or FIG. 1c is medium, low or high, respectively. Thus, the device of this type can have its color characteristic changed at the opposite side from the radiation source 50b by application of a D.C. voltage. Those suspension layers in which the suspending medium is also luminescent, or the electrophoretic material is non-luminescent but the suspending medium is luminescent, are also usable as a suspension layer 2 in the device of this type. The residual component except the one luminescent component in the suspension layer 2 must be substantially opaque with respect to radiation flux or visible light emitted from the one luminescent component in the device of this type.

The device having the radiation source behind the panel is particularly useful for usual display purposes because such a device does not occupy a large space in front of the panel.

The D.C. voltage for changing the spatial distribution of the electrophoretic material in the present invention is not always a constant D.C. voltage and may be any other D.C. voltage such as pulse voltage or pulsating electric voltage.

One can use, as the radiation flux for brightening the luminescent suspension layer in this invention, any suitable and available radiation flux capable of brightening the luminescent suspension layer of the present invention. For example, not only U.V. light but also visible light, X-ray, $\gamma$-ray, electron beam or $\alpha$-particles can be used as the radiation flux in the present invention. The luminescence phenomena brought by U.V. or visible light excitation, by X-ray or $\gamma$-ray excitation or by electron beam excitation are called photoluminescence, radioluminescence or cathodeluminescence, respectively. For example, an U.V. fluorescent lamp, a mercury lamp, a xenon lamp or a sun light can be used as the U.V. radiation source in the present invention.

U.V. fluorescent lamps such as, for example, a fluorescent lamp radiating 2,537A spectrum, a chemical lamp radiating U.V. light of about 3,000A or a black light lamp radiating U.V. light of about 3,600A are useful due to easiness of operation. By positioning plural U.V. fluorescent lamps behind the display panel of the present invention, one can construct a large and not too thick display device which can emit visible light information in front of the panel.

The radiation source is not always positioned outside of the suspension layer. The suspension layer can include the radiation source therein. Radioactive isotopes such as, for example, radium, strontium 90, tritium or promethium 147 radiate a radiation flux such as $\alpha$-particles or an electron beam. If the suspension layer of the present invention includes therein such radioactive isotope and at least one luminescent component capable of radiating visible light by the radiation flux from the radioactive isotope, the device is self-luminescent and does not need the radiation source outside of the suspension layer.

The means for brightening the suspension layer in the present invention is not restricted to the radiation source. The suspension layer of the present invention can emit visible light by excitation due to an electric field applied across the suspension layer. The luminescence phenomenon of fluorescent material brought about by application of an electric field is called electroluminescence. When the electrophoretic suspension layer of the present invention includes, as at least one component, an electroluminescent material in the suspension layer, the electric field applied across the suspension layer can brighten the electroluminescent material in the suspension layer. The electric field for brightening continuously the suspension layer comprising the electroluminescent material therein comprises any time-varying field such as an A.C. electric field, a repeated pulse field or a pulsating electric field. When the electrophoretic material 6 in FIG. 1 consists of an electroluminescent material, the suspension layer 2 can emit light upon application of, for example, an A.C. voltage from the voltage source 10 across the electrodes 8 and 9. The electric field applied across the suspension layer so as to brighten it sometimes changes the spatial distribution of the electrophoretic material in the suspending medium established by application of a D.C. voltage. For example, the spatial distribution of the electrophoretic material established as shown in FIG. 1b or 1c by the application of a D.C. voltage may sometimes be destroyed by an A.C. field from the voltage source 10, applied so as to brighten the suspension layer and change into the similar distribution of the electrophoretic material 6 as shown in FIG. 1a. The change in the spatial distribution of the electrophoretic material 6 depends upon the strength, the length of time of application or the frequency of the A.C. voltage applied thereto. In this case, if the electrophoretic material suspended in the suspending medium moves following the frequency of the applied A.C. voltage and vibrates between electrodes, the device 1 emits light, at both electrodes, cyclically corresponding to the frequency of the applied A.C. voltage.

On the other hand if the suspension layer having the spatial distribution of the electrophoretic material 6 as shown in FIG. 1a is subjected to, for example, repeated D.C. pulse voltage from the voltage source 10, the electrophoretic material 6 with negative polarity, while emitting light, moves toward an anode under influence of the D.C. pulse voltage and is deposited on the anode surface, whereby the device emits electroluminescent light at the anode on which the electrophoretic material is deposited. Therefore, when the device having a suspension layer in a liquid state is brightened by an electric field comprising D.C. component, the device cannot display stationary halftone appearance because the applied D.C. voltage desposits all of the electrophoretic material on the electrode. As described in more detail below, if the suspension layer is hardened after the desired spatial distribution of the electrophoretic material is established by application of a D.C. field, application of any electric voltage from the voltage source 10 across the suspension layer for brightening the suspension layer due to electroluminescence can hold the desired color characteristic of the device without destroying the established spatial distribution of the electrophoretic material in the suspending medium.

The suspension layer consisting of an electroluminescent electrophoretic material suspended in an electroluminescent suspending medium can also be used as a suspension layer 2. When the electrophoretic material and the suspending medium emit lights different in color hue and/or color saturation, the color characteristics of the device can be changed over wide ranges of color hue and/or color saturation by varying the polarity of, for example, a repeated D.C. pulse voltage applied across the suspension layer for brightening it. The electroluminescent suspending medium can be prepared by, for example, suspending an electroluminescent non-electrophoretic material in a non-electroluminescent suspending medium. In the present invention, the word "suspending medium" means not only a liquid or solid medium of one phase but also a suspension comprising non-electrophoretic particles suspended in a liquid or solid medium.

The visible light opaque suspending medium can be prepared by dissolving a colored substance, such as a dye, in a colorless liquid or by suspending electrically neutral colored particles, such as dyes or pigments in a colorless liquid. For example, a deep blue colored suspending medium can be prepared by dissolving oil black dyes in ethyl acetate or kerosene.

Figure 2A:
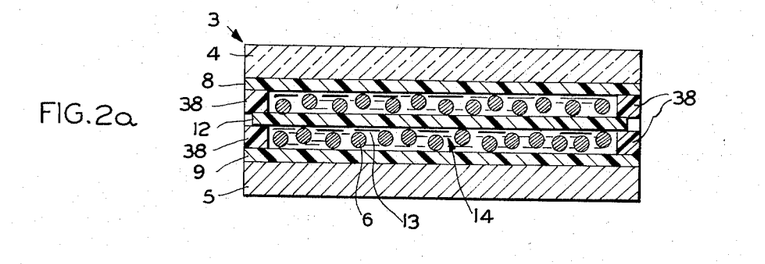
FIGS. 2a and 2b are cross-sectional views of a second embodiment of the present invention.

Referring to FIG. 2a wherein similar reference numbers designate components similar to those of FIG. 1, a luminescent or non-luminescent porous layer 12 is inserted in a suspending medium 13. The suspending medium 13, the porous layer 12 and the electrophoretic material 6 together make up a luminescent electrophoretic suspension layer 14. For simplicity of explanation, it is supposed that the suspending medium 13 is non-luminescent and transparent with respect to radiation flux and visible light. In the device of FIG. 2a, a luminescent color which is a mixture of the luminescent colors of the electrophoretic material 6 and the luminescent porous layer 12, when the porous layer is luminescent, can be seen from both electrodes under excitation, for example, by radiation flux from radiation sources 50a and 50b. In FIG. 2 and subsequent figures, the radiation sources 50a and/or 50b are omitted for clarity.

Figure 2B:
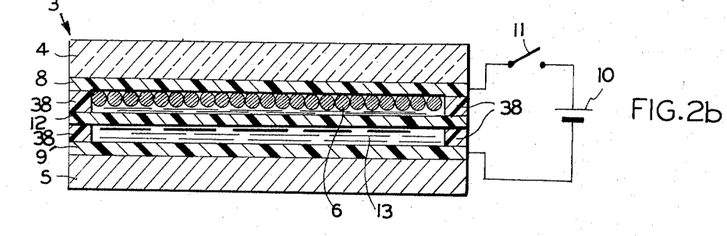

If the porous layer 12 emits red light under excitation of U.V. light, the device emits, at both electrodes, yellow light consisting of an additive mixture of the red and green luminescent lights of the porous layer 12 and the electrophoretic material 6, respectively. When a D.C. electric field is applied across the two electrodes 8 and 9, the electrophoretic material 6 is caused to pass through the porous layer 12 and to be deposited on one electrode, for example the anode, depending upon its polarity, as shown in FIG. 2b. For simplicity of the explanation, it is further supposed that the device is observed only at one side, that is at the housing vall 4, of the panel and the radiation source 50b is removed. In such a device, the housing wall 5 with the electrode 9 attached thereon can be replaced on an opaque electrode such as for example, a metal plate. When the layer of the electrophoretic material 6 deposited on the anode 8 is opaque with respect to the radiation flux from the radiation source 50a and/or the light emitted from the porous layer 12, the device substantially shows the green color of the electrophoretic material 6. When a D.C. voltage of reverse polarity is applied across the two electrodes 8 and 9, the electrophoretic material 6 is caused to pass through the porous layer 12 and to be deposited on the electrode 9. If the porous layer 12 is substantially opaque with respect to the radiation flux and/or the light emitted from the electrophoretic material 6, the device shows red color due to the red light emitted from the porous layer 12 by radiation source 50a. In such a way, the color characteristic of the device can change from the green, through yellow, to red and vice versa, depending upon the polarities of applied D.C. voltage.

A device of another type has a radiation source 50b behind the panel and the radiation source 50a is removed. The device is observed through the housing wall 4. When the porous layer 12 and the electrophoretic material 6 are opaque with respect to radiation flux but transparent with respect to visible light, or are opaque with respect to visible light but transparent with respect to radiation flux, the color characteristic of the device can change from the green, through yellow, to red and vice versa, depending upon the polarities of applied D.C. voltage. It is not always necessary that the porous layer 12 and the electrophoretic material 6 are both luminescent. When at least one of the electrophoretic material 6 and the porous layer 12 is electroluminescent, the color characteristic of the device can change by varying the polarity of repeated D.C. pulse voltage or pulsating electric voltage from the voltage source 10.

The porous layer 12 in the present invention can be made from any luminescent or non-luminescent sheet material having pores therein. The size of the pores must be large enough to pass the particles of electrophoretic material therethrough and must be as small as possible so as to disturb the transmission of the radiation flux or the light emitted from the luminescent component. Operable materials are a cloth or a mesh woven of natural or artificial fibers; a fibroid sheet having thousands of irregular pores; a thin plate with many tiny holes; and a sheet having granular material bound together with resin or an adhesive agent to form a large number of pores, Referring to FIG. 3a, wherein similar reference numbers designate components similar to those of the foregoing figures, a suspending medium 15 includes at least two kinds of electrophoretic materials 16 and 17 in a finely divided powder form. For simplicity of the explanation, the suspending medium 15 will be assumed to be non-luminescent and transparent with respect to radiation flux and visible light. The suspending medium 15 and the materials 16 and 17 together make up the luminescent electrophoretic suspension layer 18. Said two kinds of electrophoretic materials 16 and 17 are different from each other with respect to the charge polarity and the luminescent property. It is not always necessary that both of the electrophoretic materials 16 and 17 are luminescent in the suspension layer 18.

Figure 3A:
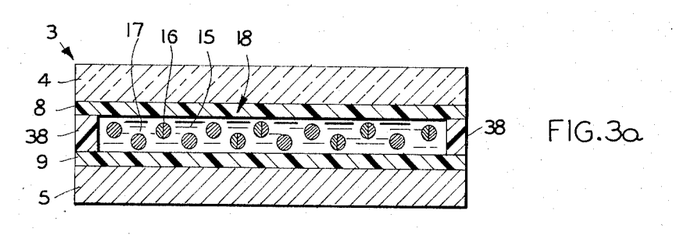
FIGS. 3a and 3b are cross-sectional views of a third embodiment of the present invention.

The device of FIG. 3a displays at the opposite sides thereof a color which is a mixture of the luminescent colors of said two kinds of electrophoretic materials 16 and 17 under excitation by radiation flux or an A.C. electric field.

Figure 3B:
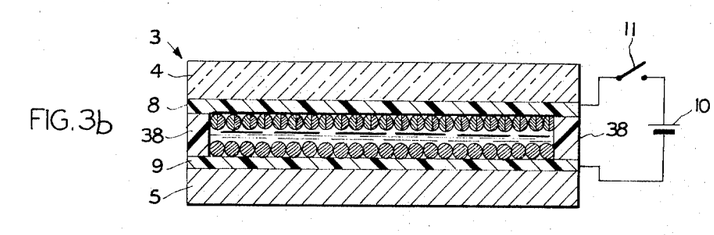

When a D.C. electric field is applied to the electrophoretic suspension layer 18, said two kinds of electrophoretic materials 16 and 17 are caused to move electrophoretically in directions opposite to each other. One material, that with a positive polarity, moves toward the cathode and is deposited on the cathode, and the other, that with a negative polarity, moves to and is deposited on the anode, as shown in FIG. 3b. When one of said electrophoretic materials 16 with positive polarity emits, for example, green light, and the other of said electrophoretic materials 17 with negative polarity emits for example, red light, the device produces a spatial distribution of electrophoretic materials 16 and 17 as shown in FIG. 3b and it can show green color at the cathode side and red color at the anode side. This is because the electrophoretic materials 16 and 17 are substantially opaque with respect to radiation flux and/or visible light.

Before the device is subjected to the D.C. electric field, the device has a yellow color at both electrodes due to a uniform spatial distribution of the green-luminescent material 16 and the red-luminescent material 17, as shown in FIG. 3a.

The color characteristic of the display and/or recording device can be reversed by reversing the polarity of the applied D.C. voltage. It is possible to construct a device having radiation source only at either side of the panel in a similar manner as described above.

Figure 4A:
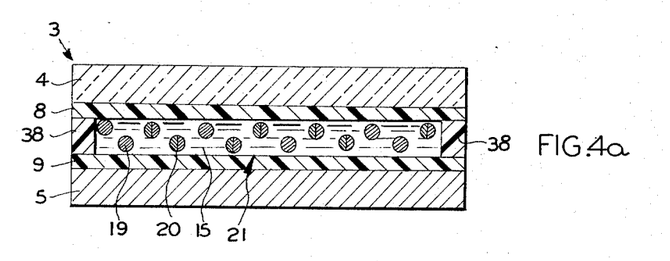
FIGS. 4a and 4b are cross-sectional views of a fourth embodiment of the present invention; electrophoretic

Referring to FIG. 4a wherein similar reference numbers designate components similar to those of the foregoing figures, an electrophoretic suspension layer 21 includes a suspending medium 15 and at least two kinds of electrophoretic materials 19 and 20 in a finely divided powder form. Said two kinds of electrophoretic materials 19 and 20 have the same charge polarity but have different electrophoretic mobilities and luminescent properties. The device of FIG. 4a initially has, at both sides, a luminescent color which is a mixture of the luminescent colors of said two kinds of electrophoretic materials 19 and 20 under excitation by radiation flux or an A.C. electric field, When said two kinds of electrophoretic materials 19 and 20 emit, for example, yellow and blue respectively, the device shows an additive white color of the yellow and blue lights at both sides. When a D.C. electric field is applied to the suspension layer 21, said two kinds of electrophoretic materials 19 and 20 are caused to move electrophoretically in the same direction.

Figure 4B:
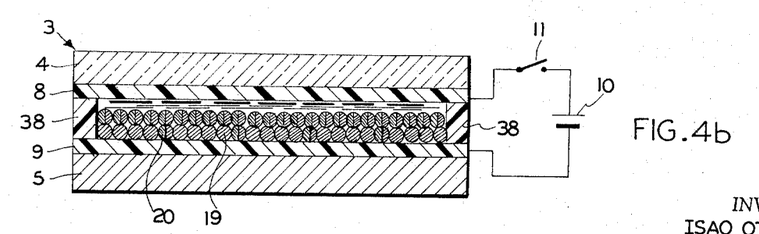

When electrophoretic materials 19 and 20 are positively charged and the electrophoretic mobility of said electrophoretic material 19 is greater than that of said electrophoretic material 20, the electrophoretic material 19 moves faster in the suspension layer 21 under the effect of a D.C. electric field than does the electrophoretic material 20. The amount of the former deposited nearest to the cathode is larger than the amount of the latter, as shown in FIG. 4b. Therefore, the device will show yellow color at the cathode side and blue color at the anode side. This is because the electrophoretic materials 19 and 20 are substantially opaque with respect to radiation flux and/or visible light.

The color of the display and/or recording device can be reversed by reversing the polarity of the applied D.C. voltage. As is apparent from the foregoing description and figures, the luminescent electrophoretic suspension layer of the present invention comprises a suspending medium and at least one electrophoretic material in a finely divided powder form suspended in said suspending medium. The suspension layer can comprise further a porous layer and/or another electrophoretic material which has different luminescent property and opposite charge polarity or different electrophoretic mobility from said at least one electrophoretic material. It is necessary that the electrophoretic suspension layer of the present invention include therein at least one luminescent component selected from the group consisting of a suspending medium, the electrophoretic material and a porous layer. Said luminescent suspension layer emits visible light when the luminescent component in the suspension layer is excited by the radiation flux or electric field, such as the A.C. pulse or pulsating electric field applied thereto.

The luminescent property of the suspension layer can be changed by a D.C. electric field applied thereto. This is because the applied D.C. electric field changes the spatial distribution of the electrophoretic material in the suspending medium electrophoretically so that the strength of the radiation flux for brightening the luminescent component in the suspension layer changes and/or the light emitted from the luminescent component in the suspension layer changes in strength and/or spectral property before the light leaves the device. The suspension layer, therefore, must comprise at least one component which is substantially opaque with respect to the radiation flux and/or the light emitted from the luminescent component in the suspension layer. The opaque component consists of at least one component except said one luminescent component and may be selected from the group consisting of the suspending medium, the electrophoretic material and the porous layer. In FIGS. 1–4, if one observes the device only at one side, for example, at the eletrode 8, the housing wall 4 and the electrode 8 must be transparent with respect to visible light. When the suspension layer is excited so as to emit light by the radiation flux, it is further necessary that at least one of the housing walls 4 and 5, and the electrode corresponding to said one housing wall, are transparent with respect to the radiation flux. It is possible to construct devices by positioning the radiation source either at the side of the housing wall 4 (in front of the panel) or at the side of the housing wall 5 (behind the panel). In each device, the housing wall and the electrode corresponding to the housing wall which are facing toward the radiation source must, of course, be transparent with respect to the radiation flux from the radiation source.

Figure 5:
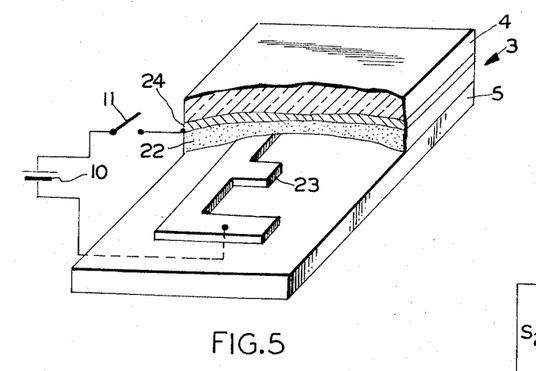
FIG. 5 is a schematic perspective view, partially broken away, of a pattern display panel in accordance with the present invention.

Referring to FIG. 5, wherein similar reference numbers designate components similar to those of the foregoing figures, a suspension layer 22 can be any possible luminescent electrophoretic suspension layer, such as the suspension layers 2, 14, 18 or 21 of FIGS. 1a, 2a, 3a, or 4a. The suspension layer 22 includes at least one electrophoretic material suspended in a suspending medium and is enclosed in a housing 3 having two opposite major housing walls 4 and 5. The first electrode 23 has a pattern, such as an E-shaped pattern. The second electrode 24 extends uniformly across the whole of the housing wall 4. It is assumed that the device is observed only at one side, that is at the housing wall 4, of the panel. Therefore, the housing wall 4 and the electrode 24 are transparent with respect to at least visible light. When the electrophoretic suspension layer 22 is electroluminescent, the device can display the E-shaped pattern upon application of, for example, sinusoidal A.C. voltage, A.C. or D.C. pulse voltage across the electrodes 23 and 24. The color of the E-shaped pattern can change when, for example, a D.C. pulse voltage of reverse polarity is applied across the electrodes 23 and 24.

When the electrophoretic suspension layer 22 emits light under excitation of radiation flux, the device has at least one radiation source in front of or behind the panel. The housing wall and the electrode attached thereon which are exposed to the radiation flux must be transparent with respect to the radiation flux. The color characteristic of the E-shaped pattern can change, while the suspension layer is exposed to the radiation flux, by varying the strength, the length of time of application or the polarity of an applied D.C. voltage across the electrodes 23 and 24.

Figure 6A:
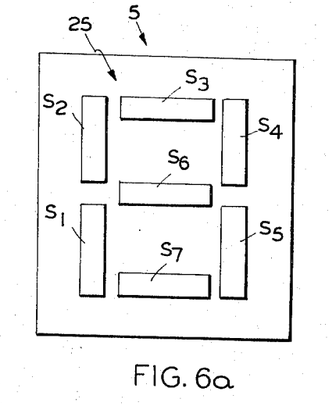
FIG. 6a is a front view of a first electrode for use in a character display panel in accordance with the present invention.
Figure 6B:
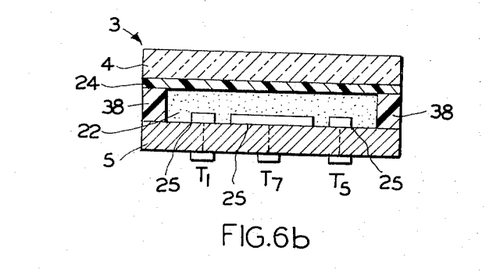

Referring to FIGS. 6a and 6b, wherein similar reference numbers designate components similar to those of the foregoing figures, a luminescent electrophoretic suspension layer 22 can be any possible electrophoretic suspension layer, such as one of the suspension layers, 2 14, 18 or 21 of FIGS. 1a, 2a, 3a, or 4a. The suspension layer 22 includes at least one electrophoretic material suspended in a suspending medium and is enclosed in a housing 3 having two opposite major housing walls 4 and 5.

A first electrode 25 is composed of a plurality of segmental electrodes $S_1 - S_7$ which are separated from each other. A second electrode 24 extends uniformly across the whole of the housing wall 4. The housing wall and the electrode through which the device is observed, are transparent with respect to at least visible light. When the suspension layer 22 is exposed to radiation flux so as to emit light, the housing wall and the electrode exposed to radiation flux must be transparent with respect to the radiation flux. Said plurality of segmental electrodes $S_1 - S_7$ are connected through leads to electrical terminals $T_1 - T_7$ positioned at the outer surface of said housing wall 5 as shown in FIG. 6b. Different combinations of said plurality of segmental electrodes $S_1 - S_7$ will display desired numerical characters when a D.C. electric field is applied across the selected segmental electrodes of said first electrode and the second electrode 24 while the suspension layer 22 is exposed to radiation flux. For example a D.C. electric field applied across the second electrode 24 and the segmental electrodes $S_3, S_4, S_5, S_6$ and $S_7$ of the first electrode will cause the device to display the numerical character 3.

Figure 6C:
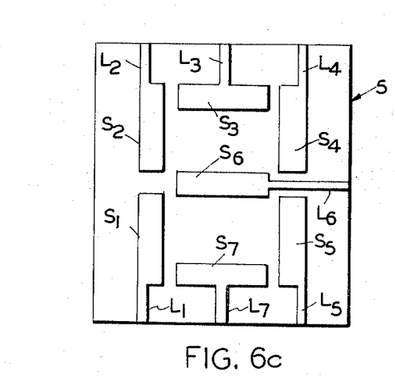
FIG. 6c is a front view of another first electrode for use in a character display panel in accordance with the present invention.

There is another method of connecting the plurality of segmental electrodes $S_1 - S_7$ to the terminals. Referring to FIG. 6c, segmental electrodes $S_1 - S_7$ are connected to electrical terminals positioned at the side surfaces of said housing wall 5 by using leads $L_1 - L_7$ formed on the same surface as that on which said segmental electrodes are positioned. These connecting methods are illustrated as examples and should not be taken as limitative.

Figure 7:
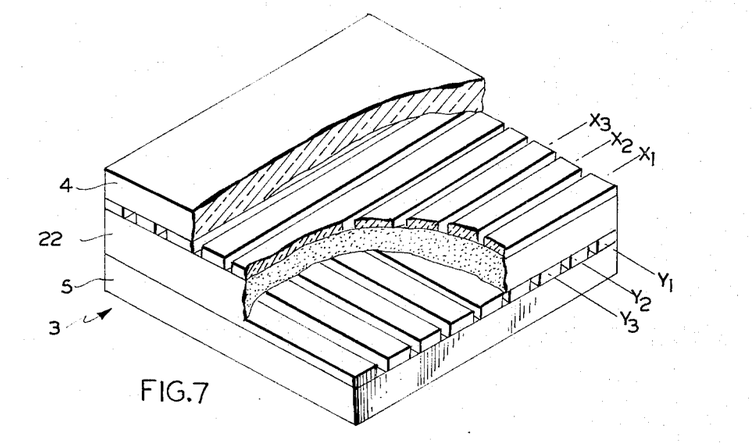
FIG. 7 is a schematic perspective view, partially broken away, of an image display panel in accordance with the present invention.

Referring to FIG. 7, wherein similar reference numbers designate components similar to those of the foregoing figures, a suspension layer 22 can be any possible electrophoretic suspension layer, such as the suspension layers 2, 14, 18 or 21 of FIGS. 1a, 2a, 3a or 4a.

The suspension layer 22 includes at least one electrophoretic material suspended in a suspending medium and is enclosed in a housing 3 having two spaced opposed major housing walls 4 and 5.

A first electrode consists of a plurality of strip electrodes $x_1, x_2, x_3, ...$ which are parallel to each other and which are attached to the inner surface of said housing wall 4. A second electrode is attached to the inner surface of said housing wall 5 and consists of a plurality of strip electrodes $y_1, y_2, y_3,...$ which are parallel to each other and are orthogonal to said strip electrodes $x_1, x_2, x_3 .... .$ When the device is observed through the housing wall 4, the housing wall 4 and the first electrode attached thereto must be transparent with respect to visible light. When the suspension layer 22 is excited by the radiation flux so as to emit light, the device has at least one radiation source in front of or behind the panel. The housing wall and the electrode facing toward the radiation source are transparent with respect to the radiation flux.

A D.C. electric field is applied across one electrode selected from among strip electrodes $x_1, x_2, x_3, ...$ and one electrode selected from among strip electrodes $y_1, y_2, y_3, ...$ for example, across strip electrodes $x_2$ and $y_3$. The portion of the suspension layer 22 at the intersection of the two strip electrodes $x_2$ and $y_3$ is actually subjected to a D.C. electric field and forms one picture element.

Thinner strip electrodes can be used to form smaller picture elements.

A selection of more than one strip electrode from among the strip electrodes forming the first and second electrodes produces a desired pattern consisting of a plurality of picture elements. Scanning techniques known to the electrical display art can be utilized to scan the picture elements sequentially and cyclically.

The above described electrodes having parts arranged in a given pattern or being formed of a plurality of segmental or strip electrodes, as shown in FIGS. 5, 6 and 7, can be easily prepared by using any available and suitable method such as electrodeposition, vacuum evaporation, printing or photoetching techniques.

Figure 8A:
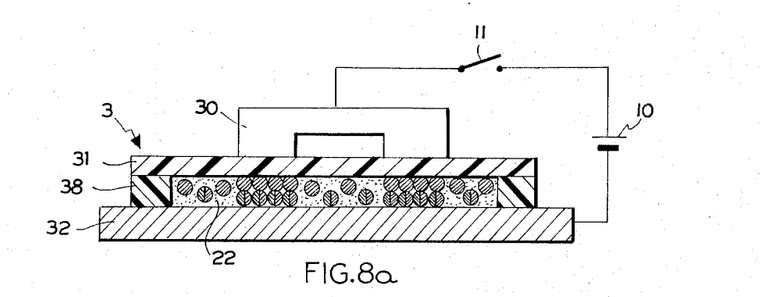
FIGS. 8a, 8b and 8c are schematic cross-sectional views of an electrostatic image display and/or recording panel in accordance with the present invention.

Referring to FIG. 8, wherein similar reference numbers designate components similar to those of the foregoing figures, a suspension layer 22 can be any possible luminescent electrophoretic suspension layer, such as the suspension layers 2, 14, 18 or 21 of FIGS. 1a, 2a, 3a or 4a. The suspension layer 22 includes at least one electrophoretic material suspended in a suspending medium and is enclosed in a housing 3 having two spaced opposed major housing walls 31 and 32, at least one of which consists of a sheet of an insulating material such as polyester, cellulose acetate, cellophane or polyethylene. In the figure, housing wall 31 is an insulating wall.

A first electrode 30 is not adhered to the insulating housing wall 31, but is placed on the outer surface of the housing wall 31 so that it can be easily removed and yet it is coupled to the suspension layer 22. The second electrode is made of, for example, a metal plate and is constituted by the other housing wall 32 as shown in FIG. 8.

When the said other housing wall has a high electrical resistance, it is possible to attach, as a second electrode, a thin electrically conductive film to the inner surface of the other housing wall 32 or it is also possible to use, as a second electrode, a metal plate on which said other housing wall 32 is placed. When the housing wall 31 has a high electrical resistance, a higher D.C. voltage must be applied across said first electrode 30 and second electrode 32.

When said first electrode 30 has a given pattern, a D.C. electric field applied across the first electrode 30 and second electrode 32 produces such pattern on the surfaces of the housing wall 31 and the housing wall 32 due to the electrophoretic movement of the electrophoretic material, even after removal of said first electrode 30. The housing wall through which the device is observed must be transparent with respect to visible light, and the housing wall exposed to radiation flux is transparent with respect to the radiation flux.

When said first electrode 30 is a pen type electrode and moves freely on the surface of the housing wall 31, one can display any desired pattern on the surface of the housing wall 31, for example writing, by applying a D.C. voltage across said pen type electrode 30 and second electrode 32, while moving said pen type electrode 30 in the said desired pattern.

An electric field can be applied across the suspension layer 22 by charging the surface of the housing wall 31 having a high electrical resistance with charged particles such as ions or electrons in a manner similar to that well-known in the electrostatic recording art.

In order to erase the patterns produced on the display sheet by any such means as described above, a conductive roller with an applied D.C. or A.C. electric voltage is caused to roll on the top surface of the insulating sheet 31 or charged particles having a positive or negative polarity are placed on the surface of said insulating housing wall 31, so as to apply an electric field for erasure across the suspension layer 22.

Figure 8B:
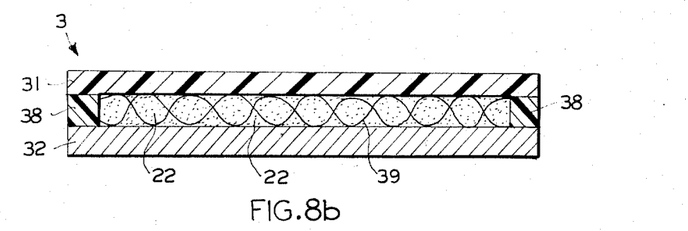
Figure 8C:
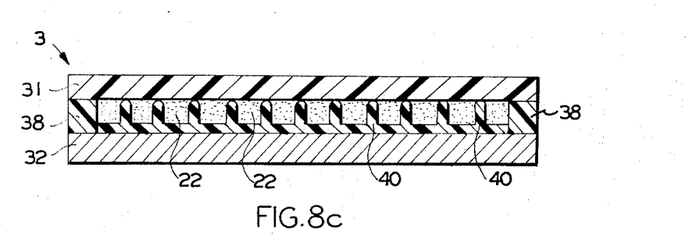

It is preferable to insert between said two major housing walls 31 and 32 a spacer such as a porous layer 39, as shown in FIG. 8b, or a sheet 40 having a plurality of projections thereon, as shown in FIG. 8c, particularly when the walls are flexible. Said spacer is substantially transparent with respect to visible light and radiation flux and can keep the suspension layer 22 at a given thickness by preventing the two major housing walls 31 and 32 from touching each other, even when an electrode is pressed against the flexible housing wall 31, or the flexible housing 3 includes an electrophoretic suspension layer in a liquid state and is bent.

Said spacer can be made from any sheet having pores or projections. One appropriate material is a screen of a material such as Tetron or nylon. The Tetron is a trade name of polyester fiber in Japan. The porous layer 12 in FIG. 2a must be substantially opaque or luminescent, but said spacer 39 or 40 is substantially transparent and non-luminescent and can act as a spacer between two major housing walls.

Said spacer is inserted between two major housing walls, or at least one of the major surfaces of the spacer is attached to the inner surface of the housing wall.

Said spacer need not be inserted in a suspension layer including a porous layer 12, if the porous layer 12 itself can act as a spacer between two major housing walls.

Figure 9:
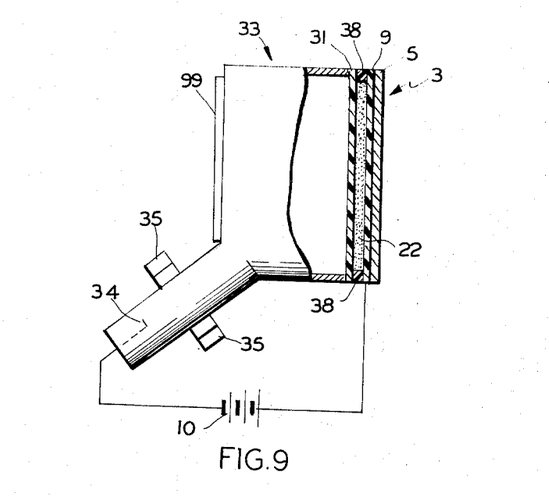
FIG. 9 is a cross-sectional view of an image display device in accordance with the present invention.

Referring to FIG. 9 wherein similar reference numbers designate components similar to those of the foregoing figures, a housing 3 includes an insulating housing wall 31 and a housing wall 5 having a first electrode 9 attached thereto and connected to a source of electric power 10. The housing wall 5 and the electrode 9 are transparent with respect to at least visible light. The electrophoretic suspension layer 22 is enclosed in the housing 3. Said housing 3 is designed to form the front face of a chamber 33 of cathode ray vacuum tube.

Negative electron charges in a given pattern are deposited on the insulating housing wall 31 by a video modulated electron gun 34 controlled by a deflecting apparatus 35 so that a D.C. electric field is applied across the electphoretic suspension layer 22. When the suspension layer 22 is exposed to the radiation flux, visible patterns can be reproduced on the transparent housing wall 5 and the housing wall 31 due to the electrophoretic movement of the electrophoretic material. The radiation flux is applied to the suspension layer throughout the window 99 of the tube 33 and the housing wall 31 or throughout the housing wall 5 and the electrode 9. When the housing wall 5 and the electrode 9 are transparent with respect to radiation flux and visible pattern light, the window 99 of the tube 33 can be removed. The first electrode 9 acts as an anode. The second electrode is the electron gun 34 which acts as a cathode. The visible pattern can be erased by the secondary emission characteristics of the housing wall 31.

The display device shown in FIG. 9 can be modified. The insulating housing wall 31 can be replaced by a well-known wire-mosaic faceplate consisting of a thin glass sheet having hundreds of fine transversely extending wires embedded therein. This wire-mosaic provides the electrical connection between the electron beam in the vacuum and the electrophoretic suspension layer which is outside the vacuum. The electron beam charges said wire-mosaic so as to apply an input electric field across the suspension layer 22.

Figure 10:
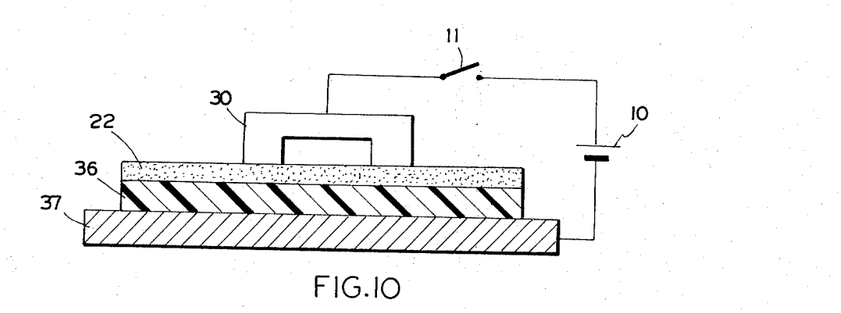
FIG. 10 is a schematic cross-sectional view of an electrostatic image display and/or recording panel in accordance with the present invention.

Referring to FIG. 10, wherein similar reference numbers designate components similar to those in the foregoing figures, a suspension layer 22 can be any possible luminescent electrophoretic suspension layer, such as the suspension layers 2, 14, 18 or 21 or FIGS. 1a, 2a, 3a or 4a. The suspension layer 22 includes at least one electrophoretic material suspended in a suspending medium and is applied to a base plate 36, such as paper, a metal plate or a plastic sheet. The base plate 36 is placed on a second electrode 37. Since the suspension layer 22 is not enclosed in a housing, it must have high viscosity, for example, it must be in a solid state at room temperature and yet it must be such that it can be softened by any suitable method, such as heating or the addition of a solvent so as to move the electrophoretic material during application of a D.C. voltage.

A first electrode 30 having a given pattern is in direct contact with the surface of the suspension layer 22. A D.C. electric field is applied across the first electrode 30 and the second electrode 37, so as to move the electrophoretic material electrophoretically while the suspension layer 22 is softened by heating or addition of a solvent. Removal of said first electrode 30 leaves the given pattern on the surface of the suspension layer 22 while the suspension layer is exposed to the radiation flux. When the base plate 36 is transparent, one can observe, through the transparent base plate 36 another given pattern having different color. A visible given pattern can be reproduced permanently on the suspension layer 22 by cooling the suspension layer or by evaporating the solvent. When the base plate 36 is conductive, it also acts as said second electrode 37.

One can use, as a luminescent component in the luminescent electrophoretic suspension layer in the present invention, a fluoresecent body which is now widely used in fluorescent lamps, scintillators, cathode ray tubes, radar or luminous paint.

Organic or inorganic fluorescent material in a finely divided powder form, such as fluorescent pigment or dye can be used directly as a luminescent electrophoretic material in the present invention. Fluorescent material which will be operable consists of, as a main body, an oxide, sulfide, selenide, silicate, phosphate or tungstate of a metal such as calcium, barium, magnesium, zinc, cadmium or strontium. A small amount of manganese, silver, copper, antimony, lead or bismuth is added, as an activator, in the main body. Organic fluorescent materials which will be operable are dyes such as the diaminostilbene group, fluorescein, thioflavine, eosine or rhodamine B.

The "luminescent property" means strength and/or spectrum and/or fluorescent time length of the light emitted from the luminescent material by a radiation flux or electric field applied thereto. The luminescent suspending medium can be prepared by dissolving the fluorescent dye in a liquid carrier or by suspending electrically neutral fluorescent material in a finely divided powder form in a liquid carrier.

The luminescent porous layer can be prepared by having non-luminescent cloth, mesh or a porous layer dyed or coated with fluorescent dye or pigment or by binding together fluorescent granular material with resin or an adhesive agent to form a large number of pores. The electrophoretic material need not always be luminescent when the suspending medium or the porous layer is luminescent. Non-luminescent electrophoretic materials which will be operable are, for example, carbon black, graphite or titanium dioxide. Black pigment can be opaque due to absorption of visible light and white pigment can be opaque due to reflection of the visible light.

An electrophoretic material suspended in a suspending medium usually has a positive or negative charge, depending upon the properties of the electrophoretic material and the suspending medium.

The electrophoretic suspension layer 2 or 14 of FIG. 1a or FIG. 2a can consist of only one electrophoretic material having a positive or negative polarity suspended in a suspending medium. The electrophoretic suspension layer 18 or 21 of FIGS. 3a or 4a must include at least two kinds of electrophoretic materials suspended in a suspending medium. Those two kinds of electrophoretic materials must have different luminescent properties and different charge polarities or electrophoretic mobilities. Therefore, in preparing an electrophoretic suspension layer 18 or 21, at least one pair of electrophoretic materials having suitable luminescent properties and electrophoretic properties must be selectively suspended in a suspending medium.

Average particle sizes of the finely divided particles which will be operable are mainly dependent upon the stability of the resultant electrophoretic suspension, and usually range from $0.1\mu$ to $50\mu$.

It is prefreed to add any suitable and available charge control agent, dispersion agent or stabilizing agent to the electrophoretic suspension layer to provide a stable suspension layer in accordance with the prior are well-known in colloidal chemistry. In order to control the charge property of the particles suspended in a suspending medium, it is preferred to use particles coated with resin which is not soluble in, or only partially soluble in, the suspending medium. When the coating resin is partially soluble in the suspending medium, it can also act as a fixing agent for a displayed image.

It is possible to use, as a suspending medium, any available and suitable liquid which is inert to the electrophoretic material, porous layer, the housing and the electrode. For producing a temporary display, one can use a suspending medium in a liquid state at room temperature, i.e. from 0° to 35°C. Suspending media which are operable for this purpose are, for example, kerosene, trichlorotrifflueroethane, isopropyl alcohol, mineral oil, liquid paraffin or olive oil. For producing a permanent display, that is, a hard copy, one can use a suspending medium which is in a solid state at room temperature and in a liquid state above room temperature, i.e. above 35°C. Suspending media which are operable for this purpose are, for example, waxes such as beeswax, vegetable wax, paraffin or synthetic wax.

When using such waxes, the device according to the present invention must be kept at a temperature higher than room temperature for producing the display or recording. After the device is subjected to a D.C. electric field at the higher temperature to vary electrophoretically the spatial distribution of said electrophoretic material, it is cooled to room temperature to produce a permanent display. If it is desired to erase the permanent display, the device is subjected to an A.C. or D.c. electric field at the high temperature. After the suspension layer is hardened, the electric field applied to the electroluminescent suspension layer so as to brighten it will not move the electrophoretic material and the device will hold the produced image.

When the suspending medium consists of a thermosetting material which is in a liquid state at room temperature, one can produce a permanent display by heating the suspending medium after the electrophoretic movement of the electrophoretic material.

Thermosetting materials which are operable as suspending media are, for example, drying oil such as linseed oil, soya oil or tung oil. When the liquid suspending medium includes a binder such as polystyrol, vinyl acetate resin or linseed oil which fixes the electrophoretic material in a finely divided powder form, one can obtain a hard copy having a permanently visible image reproduced thereon by evaporating or exhausting the residual suspending medium. The evaporation or exhausting of the suspending medium can be achieved by, for example, evacuating the housing including electrophoretic material in the suspending medium through an outlet formed, for example, in the housing wall.

A housing for use in the device according to the present invention can be prepared by using any available material which is inert to the suspending medium and the electrophoretic material. For example, a plastic sheet having a major center part cut out can be used for a frame 38 of the housing 3 as shown in FIG. 1a. One of the two opposite major housing walls can be provided by adhering, for example, a metal plate to the frame. The metal plate acts as one electrode of the aforesaid two electrodes. The other of the two opposite major housing walls can be provided by adhering, for example, a transparent glass plate having a transparent conductive film such as tin oxide, cuprous iodine or metal to the frame in such a way that the transparent conductive thin film is brought into contact with the electrophoretic suspension layer. It is possible to construct a device having a radiation source behind the panel by replacing said metal plate with another transparent glass plate havng another transparent conductive thin film.

An electrophoretic material suspended in a suspending medium can be poured into a housing having only one major housing wall. After that, the other major housing wall can be attached to the frame.

Another method is to pour the electrophoretic material suspended in a suspending medium into the housing through an inlet formed, for example, in the housing wall. The inlet is closed after the housing is filled with the electrophoretic material suspended in the suspending medium.

It has been discovered according to this invention that when at least one of the aforesaid first electrode and second electrode is coated with an insulating layer which is in contact with the aforesaid suspension layer, the device according to the present invention has an improved operating life. The insulating layer prevents the breakdown of the insulating property of the suspension layer even when a high electric voltage is applied thereto and makes it easy to remove the electrophoretic material from the electrode surface in order to form a new image by subjecting the device to a D.C. electric field or reversed polarity or to an A.C. field.

Figure 11:
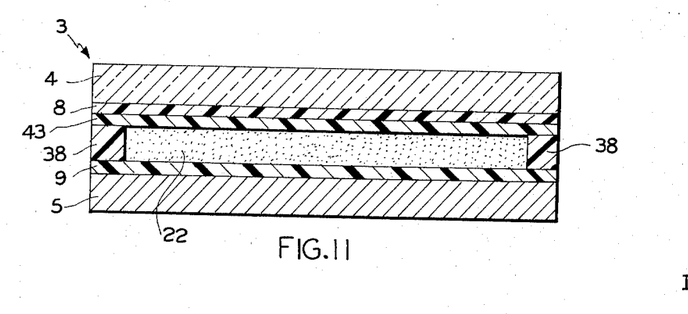
FIG. 11 is a cross-sectional view of a display panel in accordance with the present invention.

Referring to FIG. 11, wherein similar reference numbers designate components similar to those of the foregoing figures, a first electrode 8 is coated with an insulating layer 43 which is not soluble in the suspending medium. Instead of the first electrode 8, a second electrode 9 or both the first and second electrodes 8 and 9 can be coated with insulating layers. The insulating layer 43 is prepared by coating the first electrode with, for example, vinyl acetate resin, polystyrol or gelatin. A transparent insulating layer is thus applied to a transparent electrode attached to a transparent housing wall. The thickness of said insulating layer 43 depends on the electrical resistance which said insulating layer and the electrophoretic suspension layer 22 are required to have. It is preferable for operating at a low voltage that the insulating layer 43 have an electrical resistance no higher than that of the suspension layer 22.

Figure 12A:
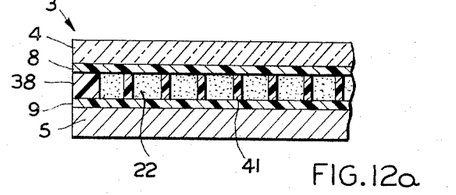
FIGS. 12a and 12b are cross-sectional views of a display panel in accordance with the present invention.

Referring to FIG. 12a, wherein similar reference numbers designate components similar to those of the foregoing figures, the suspension layer 22 has a plurality of spacers extending traversely thereof and consists of many small spaces filled with the suspension. A sheet 41 with a plurality of holes 42 therein, as shown in FIG. 13, can be used so as to divide the suspension layer 22 into separate suspension units.

Figure 13:
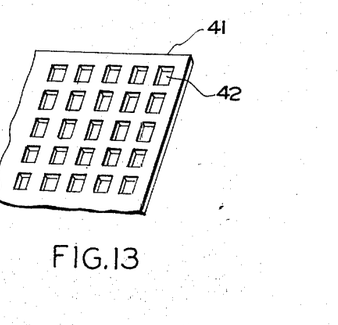
FIG. 13 is a schematic perspective view of a sheet with holes for use in the panel of FIG. 12.

Holes 42 can have any suitable shape, such as square as shown in FIG. 13, circular, rectangular, hexagonal an so on. Holes 42 can be regular or irregular in shape, dimension and order. The dimensions of the holes 42 should be selected according to the purpose of the display or the nature of the suspension, but they must be at least greater than the dimensions of electrophoretic material in the suspension.

Figure 12B:
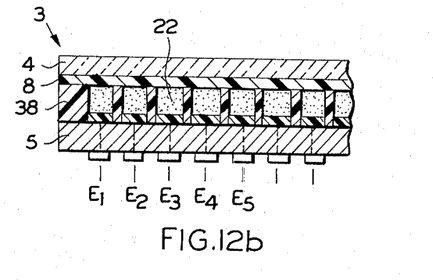

The advantages of dividing the suspension layer into a plurality of suspension units are as follows: a uniform display can be produced because flow of the suspension is restricted to the interior of each space. Said plurality of suspension units can emit lights of different color from each other. It is possible for said plurality of suspension units to have at least two colors. The plurality of suspension units are preferably inserted between two electrodes, one of which has a plurality of segment electrodes ($E_1$, $E_2$, $E_3$,...), for example, in dot form and in contact with the plurality of suspension layer units, respectively, and the other of which is transparent and covers the whole of the transparent housing wall 4, as shown in FIG. 12b. The portion of the suspension layers between each segment electrode of said one electrode and said other electrode forms one picture element. The device as shown in FIG. 12b can produce a color image by applying a D.C. voltage between the electrode 8 and selected segment electrodes while the suspension layer units are exposed to radiation flux.

Figure 12C:
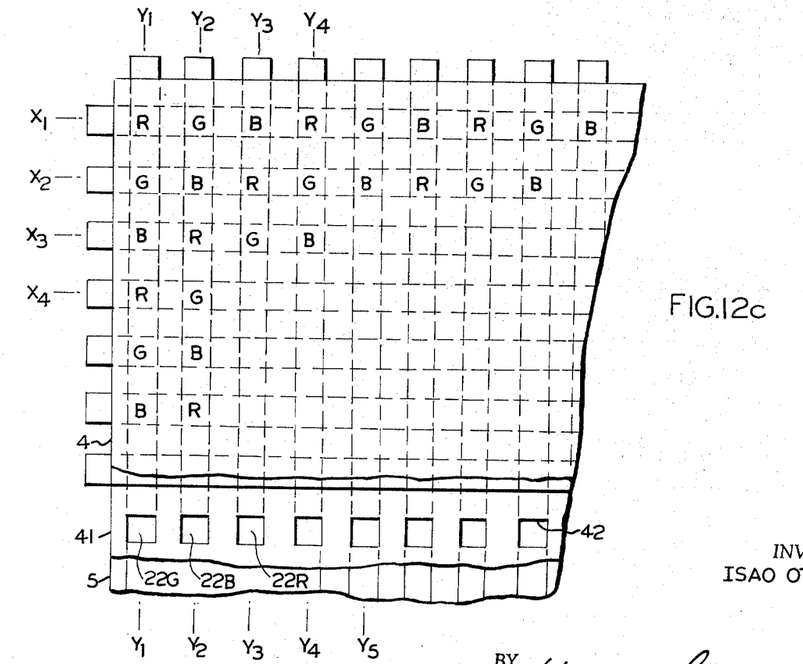
FIG. 12c is a schematic front view of a display panel in accordance with the present invention.

The best way to provide electrodes for the plurality of suspension units is to provide a first electrode consisting of a plurality of strip electrodes parallel to each other and a second electrode consisting of a plurality of strip electrodes which are orthogonal to said first electrodes, similar to the arrangement shown in FIG. 7, in such a way that each of intersection points of said first electrodes and said second electrodes is operatively associated with one of the plurality of suspension units. Each of the intersection points form a picture element in association with a respective suspension unit which emits red light, as at 22R, green light as at 22G, or blue light as shown at 22B in FIG. 12c. An application of an electric field to desired picture elements will reproduce a luminescent colored image on the image display panel.

A display panel for a color image can be prepared by using mosaic color filters and only one kind of suspension capable of changing in color in shades of grey between black and white. This is accomplished by making the areas of the transparent housing wall or the transparent electrode corresponding to each picture element in a display panel, as shown in FIG. 7 or in FIG. 12b, selectively colored so that it acts as a color filter, for example, for red, green or blue. However, a display panel having at least three kinds of suspensions, i.e. red, green and blue, will produce a better color image, especially with respect to brightness of the high lights, than will a panel with mosaic color filters on the transparent housing wall.

In a character display panel, as described in FIG. 6, the suspension corresponding to one of the segmental electrodes can consist of one or more suspension units.

The device in the present invention is not always a plane type. It is possible to construct a device having a curved housing and a curved suspension layer.

Figure 14:
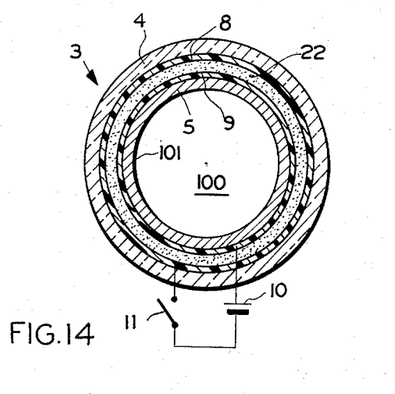
FIG. 14 is a cross-sectional view of a device in accordance with the present invention.

Referring to FIG. 14, wherein similar reference numbers designate components similar to those of the foregoing figures, the suspension layer 22 is enclosed in a housing 3 consisting essentially of a pair of concentric cylindrical pipes 4 and 5. The inner pipe 5 and the outer pipe 4 of said pair of concentric cylindrical pipes have a first electrode 9 and a second electrode 8 attached thereto, respectively, Said inner pipe 5 encloses therein gases 100 such as, for example argon or krypton and mercury and constitutes a gas discharge lamp 101 capable of emitting radiation flux of U.V. light (mainly 2,537A) when an electric field is applied to said gas discharge lamp 101 so as to discharge the gas 100.

The inner pipe 5 and the first electrode 9 attached on the outer surface thereof are transparent with respect to the radiation flux. The outer pipe 4 and the second electrode 8 attached on the inner surface thereof are transparent with respect to visible light. A D.C. voltage from a voltage source 100 is applied between said first electrode 9 and said second electrode 8 so as to change the spatial distribution of the electrophoretic material therein and thereby the luminescent property of the device through the housing wall 4. The voltage source 10 can supply not only said D.C. voltage to said suspension layer 22 but also said electric field (A.C. field) to said gas discharge lamp 101 for discharging the gas 100. The inner surface of the inner pipe 5 can have fluorescent material coated thereon so as to convert the spectrum of U.V. light from the discharge gas into any other spectrum. The device in FIG. 14 can be useful as a fluorescent lamp capable of changing its color by varying the strength, length of time of application and the polarity of applied D.C. voltage.

The amount of electrophoretic material in a suspending medium or the thickness of the electrophoretic suspension layer is selected, depending upon the opacity, luminescent property or electrophoretic property of the electrophoretic material, the range of color change required in the device, feasibility of the voltage source and so on.

Since the display device of the present invention is the luminescent type, the suspension layer must be opaque with respect to radiation flux and/or visible light in order to make a great color change. The thicker the suspension layer, the higher the applied voltage which is usually required. The thinner the suspension layer, the denser the concentration of the electrophoretic material must be to make a great color change. The thickness of the suspension layer is usually from a few microns to a few mm.

EXAMPLE 1

Ten grams of Cyanine green B particles, which are phthalocyanine green supplied by Dainippon Ink Chemical Industrial Company in Japan, are added to 100 ml of olive oil and blended well in a ball mill so as to produce a first paste. The first paste shows deep green color under illumination of whiite light. The green particles have negative charge polarity in olive oil. Ten grams of fluorescent powder particles (EL–GSL supplied by Sakai Chemical Industrial Company in Japan, main body; Zinc sulfide) are added to 50 ml of olive oil and mixed well by application of ultrasonic vibration so as to produce a second paste. The second paste has faint green color under illumination of white light. The zinc sulfide particles have weak positive charge polarity and do not show remarkable electrophoresis in olive oil. Equal volumes of the first and the second pastes are mixed well to produce a third paste. The third paste is placed between an aluminum plate and an EC glass electrode so as to produce a luminescent electrophoretic suspension layer with a thickness of 100μ. The EC glass consists of a transparent glass plate having a transparent conductive layer of tin oxide attached thereon. The suspension layer radiates yellowish green light through the EC glass electrode when the suspension layer is exposed, through the EC glass elctrode, to U.V. radiation flux from a black light lamp. When a D.C. voltage of 300 V is applied between the EC glass electrode as a cathode and the aluminum plate as an anode, the luminescent color of the suspension layer changes and is bright green color. When the polarities of applied D.C. voltage are reversed, the color of the suspension layer is deep green. The luminescent green color of the suspension layer can change in brightness by varying the strength, length of time of application or polarity of applied D.C. voltage. The display color can be kept even after the removal of the applied field. The reflective color characteristic of the suspension layer can also change in lightness of green color by application of a D.C. voltage under illumination of white light. The zinc sulfide particles used herein are electroluminescent and the suspension layer can radiate electroluminescent light by application of an electric field.

A D.C. voltage of 300 V is applied between the EC glass electrode as a cathode and the aluminum plate. After that, when a sinusoidal A.C. voltage of 250V and 1 kHz is applied between the two electrodes, the suspension layer radiates bright green light through the EC glass. When said sinusoidal A.C. voltage is applied between the two electrodes after application of a D.C. voltage in reverse polarity, the suspension layer is deep green. As described above, the suspension layer in this example can radiate visible light when U.V. light or an A.C. electric field is applied thereto. The cell is useful as a color changeable panel capable of altering the brightness of green color.

Example 2

Ten grams of fluorescent powder particles (EL–RI supplied by Dainippon Paint Company in Japan, main body; zinc sulfide) are added to 50 ml of toluene with ten grams of vinyl acetate resin dissolved therein and mixed well by application of ultrasonic vibration so as to produce a paste.

The surface of screen sheet (No. 1000 supplied by the Teijin Company in Japan) woven of polyester fiber is coated with said paste so as to produce a luminescent porous layer. The porous layer emits red light when exposed to U.V. light from a black light lamp. Five grams of another fluorescent powder particles (same as in Example 1) are added to 50 ml. of isopropyl alcohol and mixed well by an ultrasonic vibrator so as to produce a suspension. The powder particles have negative charge polarity in isopropyl alcohol. Said luminescent porous layer is inserted between two screen sheets (No. 1350 supplied by Teijin Company) so as to produce a sandwich sheet. A housing is prepared by inserting said sandwich sheet between and EC glass electrode and an aluminum plate. The housing is filled with said suspension so as to produce a luminescent electrophoretic suspensionlayer and is made liquid-tight by an adhesive agent. When the suspension layer is exposed, through the EC glass electode, to U.V. light from a black light lamp, the suspension layer emits yellow light. When a D.C. voltage of 25V is applied between the EC glass electrode as an anode and the aluminum plate as a cathode, the luminescent color of the suspension layer is green under U.V. light. Application of a D.C. voltage of reverse polarity between the EC glass electrode and the aluminum plate changes the luminescent color of the suspension layer from green, through yellow, to red. A sinusoidal A.C. voltage of 150 V and 60 Hz is half-wave rectified through a rectifier so as to produce a repeated D.C. pulse voltage. When said D.C. pulse voltage is applied between the EC glass electrode and the aluminum plate, the suspension layer emits electroluminescent orange light (when EC glass electrode is a cathode) or green light (when EC glass electrode is an anode).

The cell in this example is useful as an electric color changeable panel capable of altering the color from green, through yellow, to red and vice versa under excitation by U.V. light.

What is claimed is:

1. A device for display and/or recording, comprising a luminescent electrophoretic suspension layer having a suspending medium and at least one electrophoretic material in a finely divided powder form suspended in said suspending medium, said suspension layer having two opposite major surfaces; a first electrode and a second electrode which are spaced from and opposed to each other and are positioned on said two opposite major surfaces of said suspension layer, respectively; means for brightening said suspension layer, and means for applying an electric field across said suspension layer through said electrodes, to thereby change the spatial distribution of said electrophoretic material electrophoretically so as to change the luminescent property of said suspension layer.

2. A device as claimed in claim 1 wherein said means for brightening said suspension layer is a radiation source for applying radiation flux to said suspension layer.

3. A device as claimed in claim 2 wherein said radiation source is an U.V. light source.

4. A device as claimed in claim 2 wherein said radiation source is included in said suspension layer.

5. A device as claimed in claim 4 wherein said radiation source is a radioactive isotope selected from the group consisting of radium, strontium 90, tritium and promethium 147.

6. A device as claimed in claim 1 wherein said means for brightening said suspension layer is a voltage source for applying an electric voltage between said first electrode and said second electrode so as to brighten said suspension layer.

7. A device as claimed in claim 6 wherein said electric voltage is A.C. voltage.

8. A device as claimed in claim 6 wherein said electric voltage is repeated pulse voltage.

9. A device as claimed in claim 6 wherein said electric voltage is pulsating electric voltage.

10. A device as claimed in claim 1 wherein at least said electrophoretic material is luminescent.

11. A device as claimed in claim 1 wherein there are at least two electrophoretic materials, one of which differs in the charge polarity and luminescent property from the other.

12. A device as claimed in claim 1 wherein there are at least two electrophoretic materials, one of which differs in the electrophoretic mobility and luminescent property from the other.

13. A device as claimed in claim 1 wherein at least said suspending medium is luminescent.

14. A device as claimed in claim 1 further comprising a porous layer inserted in said suspending medium.

15. A device as claimed in claim 14 wherein at least said porous layer is luminescent.

16. A device as claimed in claim 1 wherein said suspension layer further contains a binder for said electrophoretic material.

17. A device as claimed in claim 1 wherein said means for applying an electric field includes means for controlling said electric field with respect to at least strength.

18. A device as claimed in claim 1 wherein said means for applying an electric field includes means for controlling said electric field with respect to at least length of time of application.

19. A device as claimed in claim 1 wherein said means for applying an electric field includes means for controlling said electric field with respect to at least polarity.

20. A device as claimed in claim 1 wherein said suspension layer has the property of being hardenable.

21. A device as claimed in claim 20 wherein said suspension layer has the property of being heat hardenable.

22. A device as claimed in claim 1 wherein said suspension layer has the property of being heat softenable.

23. A device as claimed in claim 1 wherein said means for applying said electric field across said suspension layer through said electrodes also acts as said means for brightening said suspension layer.

24. A device as claimed in claim 1 further including a housing enclosing said suspension layer.

25. A device as claimed in claim 24 in which said housing has two spaced opposed major housing walls between which said suspension layer and said first electrode and second electrode are positioned and at least one of which walls and said electrode facing toward said one wall are transparent with respect to at least visible light.

26. A device as claimed in claim 24 wherein at least one of said first electrode and second electrode is transparent with respect to at least visible light and said housing has a housing wall which is transparent with respect to at least visible light and covers said transparent electrode.

27. A device as claimed in claim 2 wherein at least one of said first electrode and second electrode is transparent with respect to said radiation flux and another of said first electrode and second is transparent with respect to visible light.

28. A device as claimed in claim 27 further including a housing enclosing said suspension layer, said housing having two spaced opposed major housing walls, at least one of which walls is transparent with respect to said radiation flux and has said one electrode attached therein, another of which walls is transparent with respect to visible light and has said another electrode attached therein.

29. A device as claimed in claim 28 wherein a source of said radiation flux is positioned behind said housing enclosing said suspension layer.

30. A device as claimed in claim 2 further including a housing enclosing said suspension layer, said housing having two spaced opposed major housing walls, at least one of which walls is transparent with respect to said radiation flux and visible light and has one electrode of said first electrode and second electrode attached thereto, said one electrode is transparent with respect to said radiation flux and visible light.

31. A device as claimed in claim 26 wherein at least one of said first electrode and second electrode is in the shape of a given pattern.

32. A device as claimed in claim 26 wherein at least one of said first electrode and second electrode is divided into a plurality of segmental electrodes.

33. A device as claimed in claim 26 wherein said first electrode consists of a plurality of strips of electrode material which are parallel to each other, and said second electrode consists of a plurality of strips of electrode material which are parallel to each other and are orthogonal to said first electrode strips.

34. A device as claimed in claim 26 wherein said suspension layer has a plurality of spacers therein extending transversely thereof so as to form a plurality of suspension units.

35. A device as claimed in claim 25 wherein at least one of said first electrode and second electrode is coated with an insulating layer which is in contact with said suspension layer.

36. A device as claimed in claim 34 wherein said plurality of suspension units have at least two different luminescent colors for each other.

37. A device as claimed in claim 26 wherein said transparent housing wall has mosaic color filters thereon.

38. A device as claimed in claim 28 wherein said one housing wall and said another housing wall consisting essentially of the inner pipe and the outer pipe of a pair of concentric cylindrical pipes, respectively, said inner pipe encloses therein a gas and constitutes said radiation source consisting of a gas discharge lamp capable of emitting said radiation flux.

39. A device for display, comprising a luminescent electrophoretic suspension layer having a suspending medium and at least one electrophoretic material in a finely divided powder form suspended in said suspending medium, said suspension layer having two opposite major surfaces, a transparent electrode positioned on one of said major surfaces of said suspension layer, a housing having said suspension layer enclosed therein ahd having a transparent housing wall over said electrode, and a cathode ray vacuum tube having an electron gun therein ahd having said housing closing the end of said vacuum tube opposite from said electron gun with the transparent housing wall on the outside of said vacuum tube and with said other major surface of the suspension layer facing toward said electron gun; and means for applying radiation flux to said suspension layer so as to brighten said suspension layer.

\* \* \* \* \*